United States Patent

Hisano et al.

[11] Patent Number: 5,591,535
[45] Date of Patent: * Jan. 7, 1997

[54] FERROMAGNETIC METAL POWDER

[75] Inventors: Seiichi Hisano; Kazuhisa Saito; Satoshi Aizawa; Kazushi Sano; Kazuyuki Matsumoto; Kenji Murata, all of Tokyo, Japan

[73] Assignee: Dowa Mining Co., Ltd., Tokyo, Japan

[*] Notice: The term of this patent shall not extend beyond the expiration date of Pat. No. 5,534,361.

[21] Appl. No.: 432,467

[22] Filed: May 1, 1995

Related U.S. Application Data

[63] Continuation-in-part of Ser. No. 266,227, Jun. 27, 1994, Pat. No. 5,534,361.

[30] Foreign Application Priority Data

Jul. 1, 1993 [JP] Japan .................................. 5-186578

[51] Int. Cl.$^6$ ...................................................... G11B 5/66
[52] U.S. Cl. .................... 428/694 RE; 148/301; 148/306; 420/77; 420/83; 420/103; 428/694 BR; 428/694 BA
[58] Field of Search ..................... 148/301, 306, 148/311, 315; 420/83, 77, 80, 103; 428/694 RE, 694 BR, 694 BA

[56] References Cited

U.S. PATENT DOCUMENTS

| | | | |
|---|---|---|---|
| 1,838,831 | 12/1931 | Hochheim et al. | 148/306 |
| 2,864,734 | 12/1958 | Adams et al. | 148/306 |
| 4,133,676 | 1/1979 | Oshimura et al. | 148/306 |
| 4,290,799 | 9/1981 | Schroeder et al. | 420/77 |
| 4,447,264 | 5/1984 | Suzuki et al. | 148/306 |
| 4,544,463 | 10/1985 | Pryor | 204/146 |
| 4,728,363 | 3/1988 | Crane et al. | 148/315 |
| 4,929,275 | 5/1990 | Bogatin | 75/246 |
| 4,985,073 | 1/1991 | Naumann et al. | 420/103 |
| 5,062,907 | 11/1991 | Buschow et al. | 148/301 |
| 5,192,375 | 3/1993 | Sawa et al. | 148/306 |

FOREIGN PATENT DOCUMENTS 0361698  4/1990  European Pat. Off. ............... 148/306

*Primary Examiner*—John Sheehan
*Attorney, Agent, or Firm*—Frishauf, Holtz, Goodman, Langer & Chick, P.C.

[57] ABSTRACT

There is provided an accicular ferromagnetic metal powder with which one can produce magnetic media for high-density recording that are improved in storage stability and magnetic characteristics.

The improved ferromagnetic metal powder essentially consists of iron and 50 atm % based on the amount of iron of cobalt and at least one of aluminum and yttrium or any other rare earth element and contains no more than 0.05 wt % of an element of Group Ia of the periodic table (Li, Na, K). The amount of aluminum is in the range of 0.1–30 atm %, the amount of yttrium or any other rare earth element is in the range of and 0.1–10 atm %, each being based on the total quantity of the metal elements present. In either of these cases, the residue of an element of Group IIa of the periodic table (Mg, Ca, Sr, Ba) is preferably 0.1 wt % or less.

17 Claims, No Drawings

FERROMAGNETIC METAL POWDER

This application is a continuation-in-part application of Ser. No. 08/266,227 filed Jun. 27, 1994, now U.S. Pat. No. 5,534,361.

BACKGROUND OF THE INVENTION

The present invention relates to a ferromagnetic metal powder suitable as a constitutional material for the magnetic layer of magnetic recording media such as magnetic tapes and disks.

As a result of the increase in recording density, magnetic recording media such as magnetic tapes and disks for use in audio, video and computer technologies have become increasingly smaller in size and better in performance and the magnetic powders for such recording media are accordingly shifting from the conventional iron oxide systems to metallic magnetic powders having higher coercive force and saturation magnetization.

The metallic magnetic powders for use in high-density magnetic recording applications are based typically on iron but sometimes on metals such as Ni and Co.

The common industrial process for the manufacture of iron base magnetic powders starts with iron oxyhydroxide or iron oxide-based acicular particles and consists of having an anti-sintering agent such as Si, Al, Zr or Ca deposited or adsorbed on the needles and thereafter reducing them with heat.

When synthesizing iron oxyhydroxide- or iron oxide-based compounds on an industrial scale, compounds of elements of Group Ia of the periodic table such as NaOH, $Na_2CO_3$ and KOH have been used as neutralizing agents for the principal reasons of low price and ease in handling. This has eventually produced metallic magnetic powders in which elements of Group Ia of the periodic table such as Na and K more or less remain as incidental impurities on the surfaces of the particles.

This is also true with elements of Group IIa of the periodic table. As taught in Examined Japanese Patent Publication (kokoku) Sho 59-32882 and Unexamined Published Japanese Patent Application (kokai) Hei 2-107701, those elements are occasionally used as anti-sintering agents or the like, which eventually remain on the metallic magnetic powders produced.

SUMMARY OF THE INVENTION

The present invention has been accomplished under these circumstances and has as the principal object achieving further improvements in the quality of magnetic media for high-density recording by using ferromagnetic metal powders having better magnetic characteristics and dispersibility, as well as assuring higher storage stability for the magnetic layer.

According to the present invention, there is provided a ferromagnetic metal powder that contains no more than 0.05 wt % of an element of Group Ia of the periodic table. The powder may optionally contain 0.1–30 atm % of aluminum and/or 0.1–10 atm % of Y or any other rare earth element based on the total quantity of the metal elements present. In either of these cases, the residue of a soluble element of Group IIa of the periodic table is preferably reduced to 0.1 wt % or less.

DETAILED DESCRIPTION OF THE INVENTION

As noted hereinabove, metallic magnetic powders have elements of Group Ia of the periodic table (e.g. Li, Na and K) or those of Group IIa (e.g. Mg, Ca, Sr and Ba) deposited on the surfaces of particles. The present inventors have found that if soluble salts of these basic elements are present on the surfaces of particles, the dispersibility necessary for producing coated media is deteriorated and that, furthermore, the storage stability and weathering resistance of the media product are impaired. It should also be mentioned that elements of Group Ia of the periodic table tend to accelerate the sintering that may occur in the reduction process.

Since the metallic magnetic particles for use in recent versions of magnetic recording media have become increasingly finer in order to meet the requirement for higher recording density, they are even more prone to be sintered during reduction and, at the same time, their increased surface areas contribute to a greater tendency for elements of Groups Ia and IIa to be contained in increased amounts.

The present inventors have found that the residues of these elements on the surfaces of metallic magnetic particles cause the following results:

(A) the binding power of resins becomes weak to reduce the durability of tape;

(B) because of their soluble nature, the elements combine with chlorine in the resins to form chlorides during tape storage or alternatively they precipitate as hydroxides on the tape surface, whereby troubles such as increased dropouts occur to cause deterioration in the tape characteristics;

(C) because of insufficient protection against sintering, the magnetic particles are sintered between themselves and their acicularity is impaired to cause deterioration in Hc, SFD and orientation characteristics; and (D) due to the presence of these basic elements, fatty acids or the like that act as an lubricant will be adsorbed on the particles during tape production to increase the coefficient of friction of the resulting tape.

The present inventors have found that these problems can be solved completely if the content of elements of Group Ia of the periodic table which have heretofore been held incidental components is or has been reduced to 0.05 wt % or less. As for the anti-sintering agents, soluble elements of Group IIa may be replaced by aluminum and/or rare earth elements (including Y), which form oxides without becoming soluble. If a suitable anti-sintering agent is selected from among these elements and used in an appropriate amount, the problem of lower dispersibility and storage stability that would otherwise accompany the practice of reducing the size of magnetic particles can be avoided while achieving marked improvements in magnetic characteristics.

To insure that the presence of elements of Group Ia of the periodic table is no more than 0.05 wt %, it is necessary to remove these elements if their introduction is inevitable to the process of producing metallic magnetic powders. The removal of these elements can be performed advantageously by incorporating a thorough cleaning step into the production process, for example, a step for thorough cleaning of the iron oxyhydroxide powder, the iron oxide powder or the metallic magnetic powder which have been produced. As the production proceeds from iron oxyhydroxide through iron oxide to the final metallic magnetic powder, elements of Group Ia will segregate on the surfaces of particles and hence can be removed by cleaning. More efficient removal can be achieved by using warm water or a cleaning solution whose pH has been lowered by acid addition.

This cleaning approach for removing elements of Group Ia of the periodic table has the advantage that soluble elements of Group IIa of the periodic table can also be removed.

As well as using starting materials that are free from the elements of Group Ia and IIa of the periodic table, the performance of the removal step Just described above assures that the content of an element of Group Ia is or has been reduced to 0.05 wt % or less, preferably 0.01 wt % or less, and that the content of a soluble element of Group IIa is or has been reduced to 0.1 wt % or less, preferablly 0.01 wt % or less.

By meeting these content requirments, the aforementioned problems A–D with the production of metallic magnetic powders can be avoided. If the content of an element of Group Ia exceeds 0.05 wt %, the compatibility of the magnetic particles with the binder resin becomes so low that they cannot be effectively dispersed in magnetic tape or only weak coats are formed by application of magnetic paints. As a further problem, elements of Group Ia are soluble, so they will bleed out on the surface of the tape being stored, thereby forming crystalline compounds which cause troubles such as increasd dropouts to lower the storage stability of the tape. If the content of a soluble element of Group IIa exceeds 0.1 wt %, not only the compatibility of the magnetic particles with the binder resin but also the strength of applied magnetic coats becomes low. If the content of an element of Group IIa is extremely high, the storage stability of tape also deteriorates as in the case where elements of Group Ia are used excessively.

In the present invention, aluminum and/or a rare earth element may also be incorporated in an appropriate amount and this helps improve the dispersibility of metallic magnetic particles and contribute to further improvements in magnetic characteristics. Thus, in accordance with the invention, there is provided a ferromagnetic metal powder with improved dispersibility and magnetic characteristics that is substantially free from soluble and basic elements of Groups Ia and IIa of the periodic table and which contains aluminum and/or a rare earth element.

The elements of Group Ia of the periodic table contemplated by the invention include Li, Na, K, etc.; the elements of Group IIa of the periodic table include Mg, Ca, Sr, Ba, etc.; and the rare earth elements include Y, La, Ce, Pr, Nd, Sm, Tb, Dy, Gd, etc.

The metallic magnetic powder of the present invention can advantageously be produced by a method in which given amounts of a rare earth element and aluminum are added to iron oxyhydroxide or iron oxide and the mixture is reduced under heating. Suitable examples of a metallic compound powder that is based on the iron oxyhydroxide or iron oxide to be reduced include not only $\alpha$-FeOOH, $\gamma$-FeOOH, $\alpha$-$Fe_2O_3$, $\gamma$-$Fe_2O_3$, $Fe_3O_4$ and equivalents to intermediates therebetween, but also those which contain additional metallic components such as Ni, Co, Cr, Mn and Zn. The use of metallic compound powders having better acicularity is preferred.

Exemplary aluminum compounds that can be used to have aluminum incorporated in iron oxyhydroxide or iron oxide include not only water-soluble salts such as $Al_2(SO_4)_3$, $Al(NO_3)_3$ and $AlCl_3$, but also water-soluble aluminates such as $NaAlO_2$ (sodium aluminate). The surfaces of the particles of iron oxyhydroxide or iron oxide to be reduced can be doped with aluminum compounds by a method that comprises dissolving the aluminum compounds in an aqueous alkali solution, dispersing the particles of the iron oxyhydroxide or iron oxide of interest in the solution and thereafter neutralizing the solution by either blowing carbon dioxide gas or adding an acid. In this way, the surfaces of the particles of iron oxyhydroxide or iron oxide to be reduced can be doped with aluminum compounds as crystalline or amorphous $Al_2O_3 \cdot nH_2O$ (hydrous aluminum oxide).

An alternative method comprises dissolving aluminum in the particles of the iron oxyhydroxide or iron oxide to be reduced. To form a solid solution of alumimun in $\alpha$-FeOOH or $\gamma$-FeOOH, the above-listed water-soluble Al salts or aluminates may be added to a reaction system in which an aqueous solution of a ferrous salt such as $FeSO_4$ or $FeCl_2$ is neutralized with a neutralizer such as NaOH, $Na_2CO_3$ or $NH_4OH$ and thereafter oxidized with air or the like to produce $\alpha$-FeOOH or $\gamma$-FeOOH. To form a solid solutin of aluminum in $\alpha$-$Fe_2O_3$, the above-listed water-soluble Al salts or aluminates may be added to a reaction system in which an aqueous solution of a ferric salt such as $Fe_2(SO_4)_3$ or $FeCl_3$ is treated by a hydrothermal process using a neutralizer such as NaOH or KOH to synthesize $\alpha$-$Fe_2O_3$.

In a preferred case, the thus prepared Al-containing iron oxyhydroxide or iron oxide is heated at 250°–400° C. to have aluminum fixed as $Al_2O_3$ and then used as a feed into which a rare earth element is to be incorporated. It should be noted here that as a result of the dehydration reaction that occurs in the heating step, iron oxyhydroxide has been transformed to iron oxide. Rare earth elements can be incorporated by various methods such as one that comprises dispersing the particles of the feed in a liquid containing the rare earth element to be incorporated and adding an alkali to produce a hydroxide precipitate, as well as one that comprises dispersing the particles of the feed in a liquid containing a compound of the rare earth element to be incorporated and thereafter evaporating water.

The powder of the iron oxide into which given amounts of aluminum and the rare earth element have been incorporated by the various methods described above is reduced by heating in a reducing atmosphere to produce a metallic magnetic powder that is based on aluminum- and rare earth element-containing iron. The optimal conditons for thermal reduction vary with the kind of the iron oxyhydroxide or iron oxide to be reduced but typically it is performed at a temperature of 300°–700° C. in a hydrogen stream.

The process of production described above involves the stage of using a neutralizer such as NaOH, KOH, $Na_2CO_3$ or $NH_4OH$ and, therefore, elements of Group Ia of the periodic table that originate from those neutralizers will remain in the metallic magnetic powder produced. As already mentioned herein, these residues of elements of Group Ia can advantageously be removed by performing a thorough cleaning treatment after every step of the manufacture of metallic magnetic particles.

The content of the rare earth element in the thus produced metallic magnetic powder is suitably in the range from 0.1 to 10 atm %, preferably from 0.2 to 5 atm %. Below 0.1 atm %, the incorporated rare earth element is not highly effective and sintering is prone to occur during thermal reduction. Beyond 10 atm %, an oxide of the rare earth element will form in such a great amount that the produced metallic magnetic powder has too small saturation magnetization to be suitable for use as a magnetic material.

The aluminum content is suitably in the range from 0.1 to 30 atm %, preferably from 1 to 20 atm %. Below 0.1 atm %, sintering is prone to occur during thermal reduction; beyond 30 atm %, the saturation magnetization of the product powder becomes undesirably small.

EXAMPLE 1

Fifty grams of α-FeOOH particles (length of particle, 0.2 μm; aspect ratio, 15) containing 5% of Co based on Fe were heated at 400° C. for 3 hours to produce α-Fe$_2$O$_3$, which was suspended in 5 liters of pure water, filetered, washed with pure water (60° C.) and dried.

A measured portion (10 g) of the thus prepared α-Fe$_2$O$_3$ was charged into a rotary furnace and reduced by heating at 450° C. for 10 hours with a hydrogen stream being introduced. After the end of reduction, nitrogen gas was introduced and the interior of the furnace was cooled to room temperature. Subsequently, 1% O$_2$-containing nitrogen gas was introduced for 5 hours to effect slow oxidation, thereby yielding a metallic magnetic powder.

The analytical data of this metallic magnetic powder, as well as its powder and magnetic characteristics were measured and the results are shown in Table 1, in which "BET" refers to the specific surface area as measured by the BET method, "X-ray particle size" means the particle size (in angstroms) as calculated from an X-ray diffraction peak for a (110) face of α-Fe; "Hc", "σs" and "σr/σs" designate the coercive force (Oe), saturation magnetization (emu/g) and squareness ratio, respectively, (with σr being the remanence magnetization) and Δσs signifies the percent drop of σs upon standing in a hot and humid atmosphere (60° C.×90% r.h.) for one week.

EXAMPLE 2

Aluminum sulfate [Al$_2$(SO$_4$)$_3$, 4.8 g] was dissolved in 5 liters of pure water and the pH of the solution was adjusted to 12.5 with an aqueous solution of 10% NaOH. Fifty grams of α-FeOOH particles (length of particle, 0.2 μm; aspect ratio, 15) containing 5% of Co based on Fe were suspended in the solution and stirred well to form a slurry. Carbon dioxide gas was blown into the slurry to neutralize it to a pH of 9 or less, whereby the surfaces of the α-FeOOH particles were covered with hydrous aluminum oxide (Al$_2$O$_3$'nH$_2$O).

The α-FeOOH particles thus doped with hydrous aluminum oxide were filtered, washed with water, dried and heated at 400° C. for 3 hours to effect transformation to Al$_2$O$_3$-doped α-Fe$_2$O$_3$. The powder of Al$_2$O$_3$-doped α-Fe$_2$O$_3$ was disintegrated into particles, which were suspended in pure water, refiltered and washed with water, thereby yielding Al$_2$O$_3$-doped α-Fe$_2$O$_3$ that was substantially free form Na and elements of Group Ia of the periodic table.

The thus prepared Al-containing α-Fe$_2$O$_3$ was reduced under heating as in Example 1 to produce a metallic magnetic powder. The analytical data of this powder, as well as its powder and magnetic characteristics are shown in Table 1.

EXAMPLE 3

The procedure of Example 1 was repeated to prepare α-Fe$_2$O$_3$, which was suspended in a 1-L aqueous solution of lanthanum nitrate [La(NO$_3$)$_3$, 1.8 g]. Upon thorough agitation, a slurry formed, which was then charged into a dryer and heated at 100° C. to evaporate water, thereby producing La-doped α-Fe$_2$O$_3$.

The thus produced La-containing α-Fe$_2$O$_3$ was reduced with heating as in Example 1 to yield a metallic magnetic powder. The analytical data of the powder, as well as its powder and magnetic characteristics are shown in Table 1.

EXAMPLE 4

Aluminum sulfate [Al$_2$(SO$_4$)$_3$, 4.8 g] was dissolved in 5 liters of pure water and the pH of the solution was adjusted to 12.5 with an aqueous solution of 10% NaOH. Fifty grams of α-FeOOH particles (length of particle, 0.2 μm; aspect ratio, 15) containing 5% of Co based on Fe were suspended in the solution and stirred well to form a slurry. Carbon dioxide gas was blown into the slurry to neutralize it to a pH of 9 or less, whereby the surfaces of the α-FeOOH particles were covered with hydrous aluminum oxide (Al$_2$O$_3$'nH$_2$O).

The α-FeOOH particles thus doped with hydrous aluminum oxide were filtered, washed with water, dried and heated at 400° C. for 3 hours to effect to transformation to Al$_2$O$_3$-doped α-Fe$_2$O$_3$. The powder of Al$_2$O$_3$-doped α-Fe$_2$O$_3$ was disintegrated into particles, which were suspended in pure water, refiltered and washed with water, thereby yielding Al$_2$O$_3$-doped α-Fe$_2$O$_3$ that was substantially free from Na and elements of Group Ia of the periodic table.

The thus prepared Al$_2$O$_3$-doped α-Fe$_2$O$_3$ was suspended in a 1-L aqueous solution of lanthanum nitrate [La(NO$_3$)$_3$, 1.8 g]. Upon thorough agitation, a slurry formed, which was then charged into a dryer and heated at 100° C. to evaporate water, thereby producing α-Fe$_2$O$_3$ which was doped with not only Al$_2$O$_3$ but also La.

A measured portion (10 g) of the thus prepared Al$_2$O$_3$- and La-containing α-Fe$_2$O$_3$ was charged into a rotary furnace and reduced by heating at 450° C. for 10 hours with a hydrogen stream being introduced. After the end of reduction, nitrogen gas was introduced and the interior of the furnace was cooled to room temperature. Subsequently, 1% O$_2$-containing nitrogen gas was introduced for 5 hours to effect slow oxidation, thereby yielding a metallic magnetic powder containing both Al and La. The analytical data of this metallic powder, as well as its powder and magnetic characteristics are shown in Table 1.

EXAMPLE 5

The metallic magnetic particles produced in Example 1 were suspended in CO$_2$-containing pure water, followed by filtration, washing with water and drying. A sequence of these steps were performed in a nitrogen atmosphere. The analytical data of the metallic magnetic powder produced, as well as its powder and magnetic characteristics are shown in Table 1.

EXAMPLE 6

The metallic magnetic particles produced in Example 2 were suspended in CO$_2$-containing pure water, followed by filtration, washing with water and drying. A sequence of these steps were performed in a nitrogen atmosphere. The analytical data of the metallic magnetic powder produced, as well as its powder and magnetic characteristics are shown in Table 1.

EXAMPLE 7

The procedure of Example 6 was repeated, except that the amount of aluminum sulfate [Al$_2$(SO$_4$)$_3$] dissolved in pure water was doubled, namely, 9.6 g of aluminum sulfate was dissolved rather than 4.8 g which was used in Example 2. The analytical data of the metallic magnetic powder produced, as well as its powder and magnetic characteristics are shown in Table 1.

EXAMPLE 8

The metallic magnetic particles produced in Example 3 were suspended in $CO_2$-containing pure water, followed by filtration, washing with water and drying. A sequence of these steps were performed in a nitrogen atmosphere. The analytical data of the metallic magnetic powder produced, as well as its powder and magnetic characteristics are shown in Table 1.

EXAMPLE 9

The procedure of Example 8 was repeated, except that the use of lanthanum nitrate was almost doubled, namely, the aqueous solution of 1.8 g of lanthanum nitrate $[La(NO_3)_3]$ in 1 L of water in Example 3 was replaced by an aqueous solution of 3.7 g of lanthanum nitrate in 1 L of water. The analytical data of the metallic magnetic powder produced, as well as its powder and magnetic characteristics are shown in Table 1.

EXAMPLE 10

The metallic magnetic particles produced in Example 4 were suspended in $CO_2$-containing pure water, followed by filtration, washing with water and drying. A sequence of these steps were conducted in a nitrogen atmosphere. The analytical data of the metallic magnetic powder produced, as well as its powder and magnetic characteristics are shown in Table 1.

EXAMPLE 11

A metallic magnetic powder containing both Al and La was produced as in Example 4, except that the amount of aluminum sulfate $[Al_2(SO_4)_3]$ to be dissolved in pure water was increased to 9.6 g and that an aqueous solution of 3.7 g of lanthanum nitrate was used. The magnetic particles thus prepared were suspended in $CO_2$-containing pure water, followed by filtration, washing with water and drying. A sequence of these steps were conducted in a nitrogen atmosphere. The analytical data of the metallic magnetic powder produced, as well as its powder and magnetic characteristics are shown in Table 1.

EXAMPLE 12

The procedure of Example 11 was repeated, except that the aqueous solution of 3.7 g of lanthanum nitrate was replaced by an aqueous solution of 3.9 g of terbium nitrate. The analytical data of the metallic magnetic powder produced, as well as its powder and magnetic characteristics are shown in Table 1.

EXAMPLE 13

The procedure of Example 11 was repeated, except that the aqueous solution of 3.7 g of lanthanum nitrate was replaced by an aqueous solution of 3.7 g of cerium nitrate. The analytical data of the metallic magnetic powder produced, as well as its powder and magnetic characterisics are shown in Table 1.

EXAMPLE 14

The procedure of Example 11 was repeated, except that the aqueous solution of 3.7 g of lanthanum nitrate was replaced by an aqueous solution of 3.7 g of neodymium nitrate. The analytical data of the metallic magnetic powder produced, as well as its powder and magnetic characterisics are shown in Table 1.

EXAMPLE 15

The procedure of Example 11 was repeated, except that the aqueous solution of 3.7 g of lanthanum nitrate was replaced by an aqueous solution of 3.1 g of yttrium nitrate. The analytical data of the metallic magnetic powder produced, as well as its powder and magnetic characterisics are shown in Table 1.

EXAMPLE 16

The procedure of Example 15 was repeated, except for the use of $\alpha$-FeOOH particles having a length of 0.12 µm and an aspect ratio of 15. The analytical data of the metallic magnetic powder produced, as well as its powder and magnetic characteristics are shown in Table 1.

Comparative Example 1

The procedure of Example 1 was repeated, except that $\alpha$-$Fe_2O_3$ as produced by heating at 400° C. for 3 hours was charged directly into the rotary furnace without being washed with pure water. The analytical data of the metallic magnetic powder produced, as well as its powder and magnetic characteristics are shown in Table 1.

Comparative Example 2

The procedure of Comparative Example 1 was repeated, except for the use of $\alpha$-FeOOH particles having a length of 0.12 µm and an aspect ratio of 15. The analytical data of the metallic magnetic powder produced, as well as its powder and magnetic characteristics are shown in Table 1.

Comparative Example 3

The procedure of Example 4 was repeated, except that $Al_2O_3$-doped $\alpha$-$Fe_2O_3$ as produced by heating at 400° C. for 3 hours was charged directly into the rotary furnace without being washed with pure water. The analytical data of the metallic magnetic powder produced, as well as its powder and magnetic characteristics are shown in Table 1.

Comparative Example 4

The procedure of Example 15 was repeated, except for the following three points: $\alpha$-FeOOH particles having a length of 0.12 µm and an aspect ratio of 15 were used; the step of washing $Al_2O_3$-doped $\alpha$-$Fe_2O_3$ was omitted; the final step of washing the magnetic powder with $CO_2$-containing pure water was omitted. The analytical data of the metallic magnetic powder produced, as well as its powder and magnetic characteristics are shown in Table 1.

The metallic magnetic powders produced in Examples 1–16 and Comparative Examples 1–4 were formulated into paints under the same conditions and applied to resin films under the same conditions to prepare magnetic tape samples. The characteristics of those tape samples are shown in Table 2, in which "roughness" refers to values of measurement (in angstroms) with a surface roughness meter, "gloss" refers to the degree of gloss as measured with a gloss meter, "Br" singnifies residual flux density (in gauss), "Bm" means saturation flux density (in gauss), "Br/Bm" signifies squareness ratio, "SFD" means coercive force distribution, "$\Delta Bm$" designates the percent drop of Bm upon standing in a hot and humid atmosphere (60° C.×90% r.h.) for one week, "precipitation after weathering test" describes the result of microscopic examination of the tape surface after standing in a hot and humid atmosphere (60° C.×90% r.h.) for one week, and "output" refers to values of measurement on a Hi8 deck.

TABLE 1

The Characteristics of Magnetic Powder

| | | Analytical data | | | | Length of particle μm | Aspect ratio | Powder characteristics | | | Adsorption of stearic acid mg/g | Magnetic characteristic | | | |
|---|---|---|---|---|---|---|---|---|---|---|---|---|---|---|---|
| | Fe-5Co | Al atm % | RE element name | RE element atm % | Na wt % | sol. Ca wt % | | | BET $m^2/g$ | X-ray particle size Å 1) | pH of powder | | Hc | σs | σr/σs | Δσs 2) |

| | Fe-5Co | Al atm % | RE name | RE atm % | Na wt % | sol. Ca wt % | Length μm | Aspect ratio | BET $m^2/g$ | X-ray Å | pH | Stearic mg/g | Hc | σs | σr/σs | Δσs |
|---|---|---|---|---|---|---|---|---|---|---|---|---|---|---|---|---|
| Example | | | | | | | | | | | | | | | | |
| 1 | — | — | — | 0.006 | 0.12 | 0.10 | 7 | 51 | 180 | 10.3 | 96 | 1005 | 142 | .40 | 12.1 |
| 2 | 5.0 | — | — | 0.006 | 0.12 | 0.11 | 8 | 53 | 170 | 10.1 | 100 | 1425 | 135 | .46 | 9.6 |
| 3 | — | La | 1.0 | 0.006 | 0.12 | 0.11 | 9 | 54 | 175 | 10.2 | 103 | 1320 | 137 | .46 | 10.2 |
| 4 | 5.0 | La | 1.0 | 0.006 | 0.12 | 0.12 | 11 | 57 | 165 | 10.1 | 108 | 1760 | 132 | .50 | 9.5 |
| 5 | — | — | — | Trace | 0.005 | 0.10 | 7 | 50 | 180 | 9.4 | 85 | 1000 | 143 | .41 | 11.8 |
| 6 | 5.0 | — | — | Trace | 0.005 | 0.11 | 8 | 52 | 170 | 9.6 | 88 | 1430 | 136 | .46 | 9.1 |
| 7 | 10.0 | — | — | Trace | 0.005 | 0.12 | 9 | 56 | 165 | 9.5 | 94 | 1470 | 133 | .47 | 8.9 |
| 8 | — | La | 1.0 | Trace | 0.005 | 0.11 | 9 | 53 | 175 | 9.5 | 89 | 1330 | 137 | .46 | 10.0 |
| 9 | — | La | 2.0 | Trace | 0.005 | 0.12 | 10 | 56 | 170 | 9.5 | 97 | 1350 | 134 | .47 | 8.9 |
| 10 | 5.0 | La | 1.0 | Trace | 0.005 | 0.13 | 11 | 57 | 165 | 9.6 | 97 | 1770 | 131 | .50 | 8.2 |
| 11 | 10.0 | La | 2.0 | Trace | 0.005 | 0.13 | 12 | 58 | 160 | 9.4 | 99 | 1810 | 128 | .51 | 7.9 |
| 12 | 10.0 | Tb | 2.0 | Trace | 0.005 | 0.13 | 12 | 58 | 160 | 9.5 | 97 | 1832 | 128 | .51 | 7.7 |
| 13 | 10.0 | Ce | 2.0 | Trace | 0.005 | 0.13 | 12 | 61 | 155 | 9.5 | 104 | 1805 | 128 | .51 | 8.0 |
| 14 | 10.0 | Nd | 2.0 | Trace | 0.005 | 0.13 | 12 | 59 | 160 | 9.6 | 100 | 1800 | 128 | .51 | 8.0 |
| 15 | 10.0 | Y | 2.0 | Trace | 0.005 | 0.13 | 12 | 58 | 160 | 9.5 | 99 | 1815 | 128 | .51 | 7.8 |
| 16 | 10.0 | Y | 2.0 | Trace | 0.005 | 0.08 | 12 | 64 | 150 | 9.4 | 102 | 1840 | 126 | .51 | 8.5 |
| Comparative Example | | | | | | | | | | | | | | | | |
| 1 | — | — | — | 0.13 | 0.12 | 0.10 | 6 | 50 | 180 | 10.9 | 104 | 995 | 143 | .40 | 12.1 |
| 2 | — | — | — | 0.13 | 0.12 | 0.07 | 6 | 54 | 180 | 11.0 | 108 | 975 | 140 | .38 | 14.1 |
| 3 | 5.0 | La | 1.0 | 0.13 | 0.12 | 0.11 | 11 | 57 | 170 | 11.1 | 114 | 1745 | 133 | .48 | 13.2 |
| 4 | 10.0 | Y | 2.0 | 0.16 | 0.12 | 0.08 | 11 | 63 | 155 | 10.9 | 120 | 1805 | 127 | .48 | 14.5 |

1) Calculated from X-ray diffraction peak for (110) face of α-Fe.
2) Percent drop of σs upon 1-wk standing at 60° C. × 90% r.h.

TABLE 2

Tape Characteristics

| | Roughness Å | Gloss | Hc Oe | Bm G | Br/Bm | SFD | Δ Bm % 1) | Output dB 2) | C/N dB | Precipitation after weathering test 3) |
|---|---|---|---|---|---|---|---|---|---|---|
| Example | | | | | | | | | | |
| 1 | 97 | 161 | 1010 | 3080 | 0.65 | 0.96 | 4.1 | −3.9 | −4.7 | absent |
| 2 | 93 | 172 | 1420 | 2880 | 0.72 | 0.79 | 3.2 | −0.8 | −1.0 | " |
| 3 | 92 | 173 | 1340 | 2940 | 0.71 | 0.79 | 3.4 | −1.3 | −1.4 | " |
| 4 | 85 | 181 | 1770 | 2760 | 0.76 | 0.62 | 3.8 | +0.9 | +0.7 | " |
| 5 | 93 | 177 | 1030 | 3220 | 0.69 | 0.94 | 3.9 | −3.3 | −3.6 | " |
| 6 | 89 | 175 | 1440 | 2990 | 0.75 | 0.76 | 3.0 | −0.4 | −0.6 | " |
| 7 | 87 | 179 | 1500 | 2950 | 0.77 | 0.74 | 3.0 | −0.3 | −0.5 | " |
| 8 | 88 | 178 | 1360 | 3050 | 0.76 | 0.76 | 3.5 | −0.8 | −0.5 | " |
| 9 | 85 | 181 | 1380 | 2960 | 0.78 | 0.75 | 3.0 | −0.6 | −0.7 | " |
| 10 | 80 | 186 | 1805 | 2900 | 0.81 | 0.58 | 2.8 | +1.4 | +1.3 | " |
| 11 | 79 | 188 | 1845 | 2870 | 0.84 | 0.52 | 2.8 | +1.9 | +1.8 | " |
| 12 | 78 | 189 | 1865 | 2860 | 0.83 | 0.51 | 2.7 | +2.1 | +1.9 | " |
| 13 | 79 | 187 | 1845 | 2865 | 0.84 | 0.53 | 2.8 | +1.7 | +1.6 | " |
| 14 | 79 | 188 | 1835 | 2860 | 0.84 | 0.52 | 2.8 | +1.8 | +1.7 | " |
| 15 | 77 | 190 | 1850 | 2870 | 0.84 | 0.51 | 2.6 | +2.0 | +1.9 | " |
| 16 | 75 | 191 | 1875 | 2840 | 0.83 | 0.55 | 2.9 | +2.4 | +2.5 | " |
| Comparative Example | | | | | | | | | | |
| 1 | 107 | 150 | 1005 | 2890 | 0.61 | 1.01 | 4.1 | * | | present |

TABLE 2-continued

|   | Roughness Å | Gloss | Hc Oe | Bm G | Br/Bm | SFD | ΔBm % 1) | Output dB 2) | C/N dB | Precipitation after weathering test 3) |
|---|---|---|---|---|---|---|---|---|---|---|
| 2 | Poor dispersibility made tape production impossible. | | | | | | | | | |
| 3 | 99 | 159 | 1760 | 2550 | 0.70 | 0.70 | 4.4 | +0.3 | +0.2 | present |
| 4 | 93 | 169 | 1820 | 2460 | 0.71 | 0.71 | 4.8 | +0.1 | −0.0 | present |

*The tape durability was too low to warrant measurements.
1) Percent drop of Bm upon 1-wk standing at 60° C. × 90% r.h.
2) Output measurements were conducted with a Hi8 deck.
3) After 1-wk standing at 60° C. × 90% r.h., the tape surface was microscopically examined for the precipitation of crystals.

The data in Tables 1 and 2 show the following.

(1) When no treatment was conducted to remove Na or Ca, the dispersibility of magnetic particles was extremely low (Comparative Example 2) and even when dispersion was possible, the product tape had very low weather resistance (Compartive Example 1); in addition, all comparative samples were poor in storage stability since crystals precipitated on the tape surface upon standing in a hot and humid atmosphere (60° C.×90% r.h.) for one week. In contrast, the samples of Examples 1–16 which had been subjected to the treatment for the removal of Na and Ca featured good dispersibility of magnetic particles and exhibited excellent tape durability and storage stability.

(2) As is clear from the comparison between Examples 1 and 2 or between Examples 5 and 6 (or 7), the combination of the step for Na and Ca removal with the addition of aluminum contributed to improvements in the magnetic characteristics of magnetic powder (as evidenced by higher Hc and σr/σs and lower Δσs) and, as regards the tape characteristics, the squareness ratio, SFD, ΔBm, etc. were improved accompanying those improvements in magnetic characteristics.

(3) As is clear from the comparison between Examples 1 and 3 or between Examples 5 and 8 (or 9), the combination of the step for Na and Ca removal with the addition of a rare earth element contributed to improvements in the magnetic characteristics of magnetic powder (as evidenced by higher Hc and σr/σs and lower Δσs) and, as regards the tape characteristics, the squareness ratio, SFD, ΔBm, etc. were improved accompanying those improvements in magnetic characteristics.

(4) The combination of the step for Na and Ca removal with the addition of both aluminum and a rare earth element contibuted to further improvements in the magnetic characteristics of magnetic powder (as evidenced by higher Hc and σr/σs and lower Δσs) and, as regards the tape characteristics, the squareness ratio, SFD, ΔBm, etc. were much more improved accompanying those further improvements in magnetic characteristics; thus, the improvements in the magnetic and tape characterisitics of the relevant samples were remarkable. This feature, combined with improved dispersibilitly and storage stability, made the samples ideal metallic magnetic powders.

(5) The improvements described above were marked with finer particles as is clear from the comparison between Examples 15 and 16.

Advantages of the Invention

As described on the foregoing pages, the metallic magnetic powder of the invention is substantially free from the elements of Group Ia of the periodic table and, hence, has good compatibility with the binder resin and assures high dispersibility and tape endurance. As a result, magnetic media for high-density recordig that have good storage stability can be produced using this metallic magnetic powder.

If both a rare earth element and aluminum are incorporated additionally, they interact with each other to exhibit a high anti -sintering effect, thereby helping provide metallic magnetic powders of high magnetic anisotropy which are improved in the acicularity and dispersibility of the particles.

After repeating a large number of additional experiments, the present inventors have found that the inventive concept of the present invention can be extended to a powder or particles essentially consisting of iron and cobalt so long as the cobalt content is not greater than 50 atm % based on the amount of iron contained in the powder or particles. Rather, the magnetic and other characteristic features are further improved by the addition of an appropriate amount of cobalt, thereby yielding ferromagnetic metal powder or particles highly adapted for magnetic recording media.

The reason why the cobalt content should be 50 atm % or less is that the addition of cobalt apparently improves magnetic properties, but if the cobalt content exceeds 50 atm %, some or many of the characteristic features of the powder or particles clearly start declining. For example, when the cobalt content exceeds 50 atm % based on the amount of iron, the magnetic anisotropy of the particle becomes low, and as a result, significant reduction in Hc (coercive force) and σr/σs (squareness ratio ) occurs. Reduction in electro-magnetic conversion characteristics is also remarkable. When the cobalt content exceeds 50 atm %, the alloying state of Fe-Co tends to become nonuniform. Preferably, the cobalt content should be 35 atm % or less based on the amount of iron. When iron is alloyed with cobalt in the range of the cobalt content of 10 to 35 atm % based on the amount of iron, the alloying effect is most remarkable. The Fe-Co alloying effects include 1) increase in Hc, 2) increase in σs, 3) decrease in X-ray particle size (saturation value, 30%), 4) improvement in anti-oxidation property (Δσs) (saturation value, 20%) and 5) high output and small X-ray particle size due to high Hc and high σs, which results in low particle-based noise as well as high S/N ratio.

That the Dx (X-ray particle size) value is small means that the powder is free from sintering and therefore it has good accicularity. The Dx value should not exceed 220Å. This is because if it exceeds 220Å, either output or C/N ratio becomes low.

That the σr/σs value is high also means that powder is free from sintering and therefore it has good accicularity. If σr/σs is less than 0.47, the tape prepared with this powder does not show satisfactory orientation characteristic (Br/Bm). Particles having high Hc are more suitable for use as short wave recording media.

It has also been found that the addition of aluminum and/or yttrium or any other Rare Earth element to the powder or particles can somehow improve powder or magnetic characteristics when each addition is effected in an appropriate amount.

The aluminum content in the metal powder should be in the range of 0.1–30 atm % based on the total quantity of the metal elements present in the metal powder. If the content of aluminum is less than 0.1 atm %, the effect of addition is not sufficient. If the content of aluminum exceed 30 atm %, the effect of addition is saturated.

The content of yttrium or any other rare earth element in the metal powder should be in the range of 0.1–10 atm % based on the total quantity of the metal elements present in the metal powder. If the content of yttrium or any other rare earth element is less than 0.1 atm %, the effect of addition is not sufficient. If the content of yttrium and any other rare earth element exceeds 10 atm %, the effect of addition is saturated.

Based on these and other discoveries, the present inventors have accomplish the inventions, which are summarized as follows.

Thus, in the first aspect, the present invention is to provide an accicular ferromagnetic metal powder essentially consisting of iron and 50 atm % or less based on the amount of iron of cobalt, characterized in that said powder contains 0.1–30 atm % based on the total quantity of the metal elements present of aluminum, and in that the content of an element of Group Ia of the periodic table contained as an incidental component is 0.05 wt % or less, said element of Group Ia being selected from the group consisting of lithium, sodium and potassium.

In the second aspect, the present invention is to provide accicular ferromagnetic metal particles essentially consisting of iron and 50 atm % or less based on the amount of iron of cobalt, characterized in that said particles contain 0.1–30 atm % based on the total quantity of the metal elements present of aluminum, and in that the content of an element of Group Ia of the periodic table contained as an incidental component is 0.05 wt % or less, said element of Group Ia being selected from the group consisting of lithium, sodium and potassium.

In the third aspect, the present invention is to provide an accicular ferromagnetic metal powder essentially consisting of iron and 50 atm % or less based on the amount of iron of cobalt, characterized in that said powder contains 0.1–30 atm % based on the total quantity of the metal elements present of aluminum and has an X-ray particle size of not greater than 220Å, and in that the content of an element of Group Ia of the periodic table contained as an incidental component is 0.05 wt % or less, said element of Group Ia being selected from the group consisting of lithium, sodium and potassium.

In the fourth aspect, the present invention is to provide accicular ferromagnetic metal particles essentially consisting of iron and 50 atm % or less based on the amount of iron of cobalt, characterized in that said particles contain 0.1–30 atm % based on the total quantity of the metal elements present of aluminum and has an X-ray particle size of not greater than 220Å, and in that the content of an element of Group Ia of the periodic table contained as an incidental component is 0.05 wt % or less, said element of Group Ia being selected from the group consisting of lithium, sodium and potassium.

In the fifth aspect, the present invention is to provide an accicular ferromagnetic metal powder essentially consisting of iron and 50 atm % or less based on the amount of iron of cobalt, characterized in that said powder contains 0.1–10 atm % based on the total quantity of the metal elements present of yttrium or any other rare earth element, and in that the content of an element of Group Ia of the periodic table contained as an incidental component is 0.05 wt % or less, said element of Group Ia being selected from the group consisting of lithium, sodium and potassium.

In the sixth aspect, the present invention is to provide accicular ferromagnetic metal particles essentially consisting of iron and 50 atm % or less based on the amount of iron of cobalt, characterized in that said particles contain 0.1–10 atm % based on the total quantity of the metal elements present of yttrium or any other rare earth element, and in that the content of an element of Group Ia of the periodic table contained as an incidental component is 0.05 wt % or less, said element of Group Ia being selected from the group consisting of lithium, sodium and potassium.

In the seventh aspect, the present invention is to provide an accicular ferromagnetic metal powder essentially consisting of iron and 50 atm % or less based on the amount of iron of cobalt, characterized in that said powder contains 0.1–30 atm % based on the total quantity of the metal elements present of aluminum and 0.1–10 atm % based on the total quantity of the metal elements present of yttrium or any other rare earth element, and in that the content of an element of Group Ia of the periodic table contained as an incidental component is 0.05 wt % or less, said element of Group Ia being selected from the group consisting of lithium, sodium and potassium.

In the eighth aspect, the present invention is to provide accicular ferromagnetic metal particles essentially consisting of iron and 50 atm % or less based on the amount of iron of cobalt, characterized in that said particles contain 0.1–30 atm % based on the total quantity of the metal elements present of aluminum and 0.1–10 atm % based on the total quantity of the metal elements present of yttrium or any other rare earth element, and in that the content of an element of Group Ia of the periodic table contained as an incidental component is 0.05 wt % or less, said element of Group Ia being selected from the group consisting of lithium, sodium and potassium.

In the ninth aspect, the present invention is to provide an accicular ferromagnetic metal powder essentially consisting of iron and 50 atm % or less based on the amount of iron of cobalt, characterized in that said powder contains 0.1–30 atm % based on the total quantity of the metal elements present of aluminum and 0.1–10 atm % based on the total quantity of the metal elements present of yttrium or any other rare earth element and has a coercivity of not less than 1600 Oe, and in that the content of an element of Group Ia of the periodic table contained as an incidental component is 0.05 wt % or less, said element of Group Ia being selected from the group consisting of lithium, sodium and potassium.

In the tenth aspect, the present invention is to provide accicular ferromagnetic metal particles essentially consisting of iron and 50 atm % or less based on the amount of iron of cobalt, characterized in that said particles contain 0.1–30 atm % based on the total quantity of the metal elements present of aluminum and 0.1–10 atm % based on the total quantity of the metal elements present of yttrium or any other rare earth element and has a coercivity of not less than 1600 Oe, and in that the content of an element of Group Ia of the periodic table contained as an incidental component is 0.05 wt % or less, said element of Group Ia being selected from the group consisting of lithium, sodium and potassium.

In the eleventh aspect, the present invention is to provide an accicular ferromagnetic metal powder essentially consisting of iron and 50 atm % or less based on the amount of iron of cobalt, characterized in that said powder contains 0.1–30 atm % based on the total quantity of the metal elements present of aluminum and 0.1–10 atm % based on the total quantity of the metal elements present of yttrium or any other rare earth element and has an X-ray particle size of not greater than 220Å, and in that the content of an element of Group Ia of the periodic table contained as an incidental component is 0.05 wt % or less, said element of Group Ia being selected from the group consisting of lithium, sodium and potassium.

In the twelfth aspect, the present invention is to provide accicular ferromagnetic metal particles essentially consisting of iron and 50 atm % or less based on the amount of iron of cobalt, characterized in that said particles contain 0.1–30 atm % based on the total quantity of the metal elements present of aluminum and 0.1–10 atm % based on the total quantity of the metal elements present of yttrium or any other rare earth element and has an X-ray particle size of not greater than 220Å, and in that the content of an element of Group Ia of the periodic table contained as an incidental component is 0.05 wt % or less, said element of Group Ia being selected from the group consisting of lithium, sodium and potassium.

In the thirteenth aspect, the present invention is to provide an accicular ferromagnetic metal powder essentially consisting of iron and 50 atm % or less based on the amount of iron of cobalt, characterized in that said powder contains 0.1–30 atm % based on the total quantity of the metal elements present of aluminum and 0.1–10 atm % based on the total quantity of the metal elements present of yttrium or any other rare earth element and has a value of $\sigma r$ to $\sigma s$ ratio ($\sigma r/\sigma s$) of not less than 0.47, and in that the content of an element of Group Ia of the periodic table contained as an incidental component is 0.05 wt % or less, said element of Group Ia being selected from the group consisting of lithium, sodium and potassium.

In the fourteenth aspect, the present invention is to provide accicular ferromagnetic metal particles essentially consisting of iron and 50 atm % or less based on the amount of iron of cobalt, characterized in that said particles contain 0.1–30 atm % based on the total quantity of the metal elements present of aluminum and 0.1–10 atm % based on the total quantity of the metal elements present of yttrium or any other rare earth element and has a value of $\sigma r$ to $\sigma s$ ratio ($\sigma r/\sigma s$) of not less than 0.47, and in that the content of an element of Group Ia of the periodic table contained as an incidental component is 0.05 wt % or less, said element of Group Ia being selected from the group consisting of lithium, sodium and potassium.

In the fifteenth aspect, the present invention is to provide an accicular ferromagnetic metal powder as mentioned in any of the first, third, fifth, seventh, ninth, eleventh and thirteenth aspects, wherein the content of a soluble element of Group IIa of the periodic table contained as another incidental component is 0.1 wt % or less, said element of Group IIa being selected from the group consisting of magnesium, calcium, strontium and barium.

In the sixteenth aspect, the present invention is to provide accicular ferromagnetic metal particles as mentioned in any of the second, fourth, sixth, eighth, tenth, twelfth and fourteenth aspects, wherein the content of a soluble element of Group IIa of the periodic table contained as another incidental component is 0.1 wt % or less, said element of Group IIa being selected from the group consisting of magnesium, calcium, strontium and barium.

In the seventeenth aspect, the present invention is to provide an accicular ferromagnetic metal powder as mentioned in any of the first, third, fifth, seventh, ninth, eleventh and thirteenth aspects, wherein the content of cobalt is 10–35 atm % based on the amount of iron.

In the eighteenth aspect, the present invention is to provide accicular ferromagnetic metal particles as mentioned in any of the second, fourth, sixth, eighth, tenth, twelfth and fourteenth aspects, wherein the content of cobalt is 10–35 atm % based on the amount of iron.

In the nineteenth aspect, the present invention is to provide an accicular ferromagnetic metal powder as mentioned in the fifteenth aspect, wherein the content of cobalt is 10–35 atm % based on the amount of iron.

In the twentith aspect, the present invention is to provide accicular ferromagnetic metal particles as mentioned in the sixteenth aspect, wherein the content of cobalt is 10–35 atm % based on the amount of iron.

In the twenty-first aspect, the present invention is to provide magnetic recording media comprising a substrate and accicular ferromagnetic metal particles fixed on the surface thereof via binding means, said particles being accicular ferromagnetic metal particles as mentioned in any of the second, fourth, sixth, eighth, tenth, twelfth and fourteenth aspects.

In the twenty-second aspect, the present invention is to provide magnetic recording media comprising a substrate and accicular ferromagnetic metal particles fixed on the surface thereof via binding means, said particles being accicular ferromagnetic metal particles as mentioned in the sixteenth aspect.

In the twenty-third aspect, the present invention is to provide magnetic recording media comprising a substrate and accicular ferromagnetic metal particles fixed on the surface thereof via binding means, said partices being accicular ferromagnetic metal particles as mentioned in the eighteenth aspect.

In the twenty-fourth aspect, the present invention is to provide magnetic recording media comprising a substrate and accicular ferromagnetic metal particles fixed on the surface thereof via binding means, said partices being accicular ferromagnetic metal particles as mentioned in the twentith aspect.

EXAMPLE 17

Fifty grams of $\alpha$-FeOOH (length of particle, 0.12 µm; aspect ratio, 8) were suspended in 5 liters of pure water and the suspension was well agitated. Sixty cc of a solution containing 1M/1 of cobalt chloride was added to the suspension and it was agitated. Fourty five grams of an aqueous 10% NaOH solution were further added to the suspension and it was agitated, followed by dissolving therein 28 cc of 1M/1 aluminum sulfate [$Al_2(SO_4)_3$] solution to form a slurry. Carbon dioxide gas was blown into the slurry to neutralize it to a pH of 9 or less, whereby the surfaces of the $\alpha$-FeOOH particles containing 10% based on the amount of Fe of Co were covered with hydrous aluminum oxide ($Al_2O_3 \cdot nH_2O$).

The α-FeOOH particles thus doped with hydrous aluminum oxide were filtered, washed with water, dried and heated at 400° C. for 3 hours to effect transformation to $Al_2O_3$-doped α-$Fe_2O_3$. The powder of $Al_2O_3$-doped $Fe_2O_3$ was disintegrated into particles, which were suspended in pure water, refiltered and washed with water, thereby yielding $Al_2O_3$-doped α-$Fe_2O_3$ that was substantially free from Na and elements of Group Ia of the periodic table.

A measured portion (10 g) of the thus prepared $Al_2O_3$-doped α-$Fe_2O_3$ was charged into a rotary furnace and reduced by heating at 450° C. for 10 hours with a hydrogen stream being introduced. After the end of reduction, nitrogen gas was introduced and the interior of the furnace was cooled to room temperature. Subsequently, 1% $O_2$-containing nitrogen gas was introduced for 5 hours to effect slow oxidation, thereby yielding an Al-containing metallic magnetic powder. The Al-containing metallic magnetic powder was suspended in pure water containing carbon dioxide gas, filtered, washed with water and dried. A sequence of these steps were performed in an $N_2$ atmosphere. The analytical data of this metallic magnetic powder as well as its powder and magnetic charateristics were measured and the results are shown in Table 3.

EXAMPLE 18

The procedure of Example 17 was repeated, except that the solution containing 1M/1 of cobalt chloride was used in an amount of 120 cc and the aqueous 10% NaOH solution was used in an amount of 90 grams so as to obtain α-FeOOH particles containing 20% based on the amount of Fe of Co. The analytical data of the resulting metallic magnetic powder as well as its powder and magnetic characteristics were measured and the results are shown in Table 3.

EXAMPLE 19

The procedure of Example 17 was repeated, except that the solution containing 1M/1 of cobalt chloride was used in an amount of 180 cc and the aqueous 10% NaOH solution was used in an amount of 135 grams so as to obatin α-FeOOH particles containing 30% based on the amount of Fe of Co. The analytical data of the resulting metallic magnetic powder as well as its powder and magnetic characteristics were measured and the results are shown in Table 3.

EXAMPLE 20

The procedure of Example 17 was repeated, except that the solution containing 1M/1 of cobalt chloride was used in an amount of 240 cc and the aqueous 10% NaOH solution was used in an amount of 180 grams so as to obtain α-FeOOH particles containing 40% based on the amount of Fe of Co. The analytical data of the resulting metallic magnetic powder as well as its powder and magnetic characteristics were measured and the results are shown in Table 3.

EXAMPLE 21

The procedure of Example 17 was repeated, except that the solution containing 1M/1 of cobalt chloride was used in an amount of 300 cc and the aqueous 10% NaOH solution was used in an amount of 225 grams so as to obtain α-FeOOH particles containing 50% based on the amount of Fe of Co. The analytical data of the resulting metallic magnetic powder as well as its powder and magnetic characteristics were measured and the results are shown in Table 3.

Comparative Example 5

The procedure of Example 17 was repeated, except that the solution containing 1M/1 of cobalt chloride was used in an amount of 330 cc and the aqueous 10% NaOH solution was used in an amount of 258 grams so as to obtain α-FeOOH particles containing 55% based on the amount of Fe of Co. The analytical data of the resulting metallic magnetic powder as well as its powder and magnetic characteristics were measured and the results are shown in Table 3.

EXAMPLE 22

The procedure of Example 19 was repeated, except that the solution containing 1M/1 of cobalt chloride was used in an amount of 180 cc, the aqueous 10% NaOH solution was used in an amount of 135 grams and the 1M/1 aluminum sulfate $[Al_2(SO_4)_3]$ solution was used in an amount of by 135 grams so as to obtain α-FeOOH particles containing 30% based on the amount of Fe of Co, which were doped with hydrous aluminum oxide ($Al_2O_3 \cdot nH_2O$). The analytical data of the resulting metallic magnetic powder as well as its powder and magnetic characteristics were measured and the results are shown in Table 3.

EXAMPLE 23

Fifty grams of α-FeOOH (length of particle, 0.12 μm; aspect ratio 8) were suspended in 5 liters of pure water with sufficient agitation to form a slurry, to which 45 grams of an aqueous 10% NaOH solution was added with agitation so as to form α-FeOOH containing 10% based on the amount of Fe of Co. The α-FeOOH thus prepared was filtered, washed with water, dried and heated at 400° C. for 3 hours to effect transformation to α-$Fe_2O_3$. This α-FeOOH powder was then disintegrated into particles, which were suspended in pure water, refiltered and washed with water, thereby yielding α-$Fe_2O_3$ that was substantially free from Na and any other elements of Group Ia of the periodic table.

The resulting α-$Fe_2O_3$ was suspended in 1 liter of an aqueous solution in which 3.1 grams of yttrium nitrate had been dissolved. One hundred grams of an aqueous 20% $NH_3$ solution were added to the former solution and it was stirred well to form a slurry, which was then filtered, washed with water and dried to yield yttrium-containing α-$Fe_2O_3$.

A measured portion (10 g) of the thus prepared yttrium-containing α-$Fe_2O_3$ was charged into a rotary furnace and reduced by heating at 450° C. for 10 hours with $H_2$ stream being introduced. After the end of the reduction, nitrogen gas was introduced and the interior of the furnace was cooled to room temperature. Subsequently, 1% $O_2$-containing nitrogen gas was introduced for 5 hours to effect slow oxidation, thereby yielding Y-containing metallic magnetic powder. Then, the resulting powder was suspended in a carbon dioxide-containing pure water, filtered, washed with water and dried. A sequence of these steps were performed in an $N_2$ atmosphere. The analytical data of the resulting metallic magnetic powder as well as its powder and magnetic characteristics were measured and the results are shown in Table 3.

19

EXAMPLE 24

The procedure of Example 23 was repeated, except that the amount of the 1M/1 cobalt chloride solution used was 120 cc and the amount of the aqueous 10% NaOH solution used was 90 g so as to produce α-FeOOH particles containing 20% based on the amount of Fe of Co. The analytical data of the resulting metallic magnetic powder as well as its powder and magnetic characteric were measured and the results are shown in Table 3.

EXAMPLE 25

The procedure of Example 23 was repeated, except that the amount of the 1M/1 cobalt chloride solution used was 180 cc, and the amount of the addition of the aqueous 10% NaOH solution was 135 g, thereby yielding α-FeOOH particles containing 30% based on the amount of Fe of Co. The analytical data of the resulting metallic magnetic powder as well as its powder and magnetic characteric were measured and the results are shown in Table 3.

EXAMPLE 26

The procedure of Example 23 was repeated, except that the amount of 1M/1 cobalt chloride solution used was 240 cc, and the amount of the aqueous 10% NaOH solution used was 180 g so as to yield α-FeOOH particles containing 40% based on the amount of Fe of Co. The analytical data of the resulting metallic magnetic powder as well as its powder and magnetic characteristics were measured and the results are shown in Table 3.

EXAMPLE 27

The procedure of Example 23 was repeated, except that the amount of 1M/1 cobalt chloride solution used was 300 cc, and the amount of the aqueous 10% NaOH solution added was 225 g so as to yield α-FeOOH particles containing 50% based on the amount of Fe of Co. The analytical data of the resulting metallic magnetic powder as well as its powder and magnetic characterisitics were measured and the results are shown in Table 3.

Comparative Example 6

The procedure of Example 23 was repeated, except that the amount of 1M/1 cobalt chloride solution used was 330 cc and the amount of the aqueous 10% NaOH solution added was 258 g, thereby yielding α-FeOOH particles containing 55% based on the amount of Fe of Co. The analytical data of the resulting metallic magnetic powder as well as its powder and magnetic characteristics were measured and the results are shown in Table 3.

EXAMPLE 28

The procedure of Example 25 was repeated, except that the amount of 1M/1 cobalt chloride solution used was 180 cc, and the amount of the aqueous 10% NaOH solution added was 135 g, thereby producing α-FeOOH containing 30% based on the amount of Fe of Co, and 1 liter of an aqueous solution containing 9.3 g of yttrium nitrate was used. The analytical data of the resulting metallic magnetic powder as well as its powder and magnetic characteristics were measured and the results are shown in Table 3.

EXAMPLE 29

Fifty grams of α-FeOOH particles (length of particle, 0.12 μm; aspect ratio, 8) were suspended in 5 liters of pure water, followed by stirring well and adding thereto 60 cc of a solution containing 1M/1 of cobalt chloride and the resulting mixture was agitated. Forty five grams of an aqueous 10% NaOH solution was added to the mixture and it was agitated followed by adding thereto 28 cc of a solution containing 1M/1 of aluminum sulfate, $Al_2(SO_4)_3$, to form a slurry. Carbon dioxide gas was blown into the slurry to neutralize it to a pH of 9 or less, whereby the surfaces of the α-FeOOH particles containing 10%, of the amount of Fe, of Co were covered with hydrous aluminum oxide ($Al_2O_3 \cdot nH_2O$).

The α-FeOOH particles thus covered with hydrous aluminum oxide were filtered, washed with water, dried and heated at 400° C. for 3 hours to effect transformation to $Al_2O_3$-doped α-$Fe_2O_3$. The powder of $Al_2O_3$-doped α-$Fe_2O_3$ was disintegrated into particles, which were suspended in pure water, refiltered, washed with water, dried and heated at 400° C. for 3 hours to effect transformation to $Al_2O_3$-doped α-$Fe_2O_3$. The $Al_2O_3$-doped α-$Fe_2O_3$ particles thus obtained were disintegrated, suspended in pure water, refiltered and washed with water, thereby yielding $Al_2O_3$-doped α-$Fe_2O_3$ which was substantially free of Na and any other elements of Group Ia of the periodic table.

The powder of $Al_2O_3$-doped α-$Fe_2O_3$ which was substantially free of Na and other Group Ia elements thus produced was suspended in 1 liter of an aqueous solution which had dissolved therein 3.1 g of yttrium nitrate, followed by adding thereto 100 g of an aqueous 20% $NH_3$ solution, agitating well, filtering, washing with water and drying to thereby yield Y-doped product of the $Al_2O_3$-doped α-$Fe_2O_3$.

A measured portion (10 g) of the thus prepared $Al_2O_3$ and Y-containing α-$Fe_2O_3$ was charged into a rotary furnace and reduced by heating at 450° C. for 10 hours with a hydrogen stream being introduced. After the end of reduction, nitrogen gas was introduced and the interior of the furnace was cooled to room temperature. Subsequently, 1% $O_2$-containing nitrogen gas was introduced for 5 hours to effect slow oxidation, thereby yielding a metallic magnetic powder containing both Al and Y. The metallic magnetic powder thus produced was suspended in $CO_2$-containing pure water, followed by filtration, washing with water and drying. A sequence of these steps were performed in a nitrogen atmosphere. The analytical data of the metallic magnetic powder produced, as well as its powder and magnetic characteristics are shown in Table 3.

EXAMPLE 30

The procedure of Example 29 was repeated, except that the 1M/1 cobalt chloride solution was used in an amount of 120 cc, the aqueous 10% NaOH solution was added in an amount of 90 g to thereby yield α-FeOOH containing 20%, based on the amount of Fe of Co. The analytical data of the metallic magnetic powder produced, as well as its powder and magnetic characteristics are shown in Table 3.

EXAMPLE 31

The procedure of Example 29 was repeated, except that the 1M/1 cobalt chloride solution was used in an amount of 180 cc, the aqueous 10% NaOH solution was used in an amount of 135 g and α-FeOOH containing 30%, based on the amount of Fe, of Co was produced. The analytical data of the thus produced metallic magnetic powder, as well as its powder and magnetic characteristics are shown in Table 3.

EXAMPLE 32

The procedure of Example 29 was repeated, except that the 1M/1 cobalt chloride solution was used in an amount of 240 cc, the aqueous 10% NaOH solution was added in an amount of 180 g and α-FeOOH particles containing 40%, based on the amount of Fe, of Co were produced. The analytical data of the resulting metallic magnetic powder, as well as its powder and magnetic characteristics are shown in Table 3.

EXAMPLE 33

The procedure of Example 29 was repeated, except that the 1M/1 cobalt chloride solution was used in an amount of 300 cc, the aqueous 10% NaOH solution was added in an amount of 225 g and α-FeOOH particles containing 50%, based on the amount of Fe, of Co were produced. The analytical data of the thus produced metallic magnetic powder, as well as its powder and magnetic characteristics are shown in Table 3.

Comparative Example 7

The procedure of Example 29 was repeated, except that the 1M/1 cobalt chloride solution was used in an amount of 330 cc, the aqueous 10% NaOH solution was added in an amount of 258 g and α-FeOOH particles containing 55%, based on the amount of Fe, of Co were produced. The analytical data of the produced metallic magnetic powder, as well as its powder and magnetic characteristics are shown in Table 3.

EXAMPLE 34

Fifty grams of α-FeOOH (length of particle, 0.12 μm; aspect ratio, 8) were suspended in 5 liters of pure water and the slurry was stirred well before 180 cc of a solution containing 1M/1 of cobalt chloride was added thereto and it was agitated. Subsequently, 135 g of an aqueous 10% NaOH solution was added to the slurry, which was stirred and 28 cc of a solution containing 1M/1 of aluminum sulfate $Al_2(SO_4)_3$ was dissolved therein. Carbon dioxide gas was blown into the slurry to neutralize it to a pH of 9 or less, whereby the surfaces of the α-FeOOH particles containing 30%, of the amount of Fe, of Co were covered with hydrous aluminum oxide ($Al_2O_3 \cdot nH_2O$).

The α-FeOOH particles thus doped with hydrous aluminum oxide were filtered, washed with water, dried and heated at 400° C. for 3 hours to effect transformation to $Al_2O_3$-doped α-$Fe_2O_3$. The powder of $Al_2O_3$-doped α-$Fe_2O_3$ was disintegrated into particles, which were suspended in pure water, refiltered and washed with water, thereby yielding $Al_2O_3$-doped α-$Fe_2O_3$ which were substantially free of Na and any other elements of Group Ia of the periodic table.

Subsequently, the $Al_2O_3$-doped α-$Fe_2O_3$ powder thus produced was disintegrated into particles, which were suspended in pure water, refiltered and washed with water, thereby yielding $Al_2O_3$-doped α-$Fe_2O_3$ particles which were substantially free of Na and any other Group Ia elements of the periodic table.

The $Al_2O_3$-doped α-$Fe_2O_3$ particles thus produced were dissolved in 1 liter of an aqueous solution having contained therein 9.3 g of yttrium nitrate to yield a slurry, to which 100 g of an aqueous 20% $NH_3$ solution was added and the slurry was stirred well followed by filtration, washing with water and drying, thereby covering the surfaces of the $Al_2O_3$-doped α-FeOOH particles with Y.

A measured portion (10 g) of the thus obtained $Al_2O_3$ and Y-containing α-$Fe_2O_3$ was charged into a rotary furnace and reduced by heating at 450° C. for 10 hours with a hydrogen stream being introduced. After the end of reduction, nitrogen gas was introduced and the interior of the furnace was cooled to room temperature. Subsequently, 1% $O_2$-containing nitrogen gas was introduced for 5 hours to effect slow oxidation, thereby yielding a metallic magnetic powder containing both Al and Y. The metallic magnetic particles thus produced was suspended in $CO_2$-containing pure water, followed by filtration, washing with pure water and drying. A sequence of these steps were performed in a nitrogen atmosphere. The analytical data of the metallic magnetic powder produced, as well as its powder and magnetic characteristics are shown in Table 4.

EXAMPLE 35

The procedure of Example 34 was repeated, except that 50 g of α-FeOOH particles (length of particle, 0.12 μm; aspect ratio, 8) were suspended in 5 liters of pure water followed by stirring well to form a slurry, to which 180 cc of a solution containing 1M/1 of cobalt chloride was added and the slurry was stirred and then 135 g of an aqueous 10% NaOH solution was added thereto followed by stirring well and 14 cc of a solution containing 1M/1 of $Al_2(SO_4)_3$ was dissolved therein. The analytical data of the metallic magnetic powder produced, as well as its powder and magnetic characteristics are shown in Table 4.

EXAMPLE 36

Fifty grams of α-FeOOH (length of particle, 0.12 μm; aspect ratio, 8) were suspended in 5 liters of pure water followed by stirring well to form a slurry, to which 180 cc of a solution containing 1M/1 of cobalt chloride was added and the slurry was stirred. Subsequently, 135 g of an aqueous 10% NaOH solution was added to the slurry, and it was stirred well, followed by dissolving therein 28 cc of a solution having contained therein 1M/1 of aluminum sulfate $Al_2(SO_4)_3$. Carbon dioxide gas was blown into the slurry to neutralize it to a pH of 9 or less, whereby the surfaces of the α-FeOOH particles containing 30%, based on the amount Fe, of Co were covered with hydrous aluminum oxide ($Al_2O_3 \cdot nH_2O$).

The α-FeOOH particles thus covered with hydrous aluminum oxide were filtered, washed with water, dried and heated at 400° C. for 3 hours to effect transformation to $Al_2O_3$-doped α-$Fe_2O_3$. The thus produced powder of $Al_2O_3$-covered α-FeOOH was disintegrated into particles, which were suspended in pure water, refiltered and washed with water, thereby yielding $Al_2O_3$-covered α-$Fe_2O_3$ which was substantially free of Na and any other elements of Group Ia of the periodic table.

The thus produced $Al_2O_3$-covered α-$Fe_2O_3$ particles were suspended in 1 liter of an aqueous solution having dissolved therein 7.2 g of lanthanum nitrate, followed by adding thereto 100 g of an aqueous 20% $NH_3$ solution and stirring well. Subsequently, the slurry was filtered, washed with water and dried, thereby depositing La on the particles of $Al_2O_3$-doped α-$Fe_2O_3$.

A measured portion (10 g) of the thus prepared $Al_2O_3$ and La-containing $\alpha\text{-}Fe_2O_3$ was charged into a rotary furnace and reduced by heating at 450° C. for 10 hours with a hydrogen stream being introduced. After the end of reduction, nitrogen gas was introduced and the interior of the furnace was cooled to room temperature. Subsequently, 1% $O_2$-containing nitrogen gas was introduced for 5 hours to effect slow oxidation, thereby yielding a metallic magnetic powder containing both Al and La. The metallic magnetic powder thus produced was suspended in $CO_2$-containing pure water, followed by filtration, washing with water and drying. A sequence of these steps were performed in a nitrogen atmosphere. The analytical data of the metallic magnetic powder produced, as well as its powder and magnetic characteristics are shown in Table 4.

EXAMPLE 37

The procedure of Example 36 was repeated, except that the 1M/1 cobalt chloride solution was used in an amount of 60 cc and the aqueous 10% NaOH solution was added in an amount of 45 g to form $\alpha\text{-}FeOOH$ particles containing 10%, based on the amount of Fe, of Co, and 1 liter of the aqueous solution having dissolved therein 3.6 g of lanthanum nitrate was used. The analytical data of the thus produced metallic magnetic powder, as well as its powder and magnetic characteristics are shown in Table 4.

EXAMPLE 38

Fifty grams of $\alpha\text{-}FeOOH$ particles (length of particles, 0.10 µm; aspect ratio, 5) were suspended in 5 liters of pure water to form a slurry and it was stirred well. After stirring, 180 cc of a solution containing 1M/1 of cobalt chloride was added to the slurry and it was stirred. Subsequently, 135 g of an aqueous 10% NaOH solution was added thereto, followed by stirring and dissolving therein 28 cc of a solution having contained therein 1M/1 of aluminum sulfate $Al_2(SO_4)_3$. Carbon dioxide gas was blown into the slurry to neutralize it to a pH of 9 or less, whereby the surfaces of the $\alpha\text{-}FeOOH$ particles containing 30%, based on the amount of Fe, of Co were covered with hydrous aluminum oxide $(Al_2O_3 \cdot nH_2O)$.

The $\alpha\text{-}FeOOH$ particles thus covered with hydrous aluminum oxide were filtered, washed with water, dried and heated at 400° C. for 3 hours to effect transformation to $Al_2O_3$-doped $\alpha\text{-}Fe_2O_3$. The powder of $Al_2O_3$-doped $\alpha\text{-}Fe_2O_3$ was disintegrated into particles, which were suspended in pure water, refiltered and washed with water, thereby yielding $Al_2O_3$-doped $\alpha\text{-}Fe_2O_3$ which was substantially free of Na and any other Group Ia elements of the periodic table.

The particles thus prepared were suspended in 1 liter of an aqueous solution having contained therein 6.2 g of yttrium nitrate, followed by adding thereto 100 g of an aqueous 20% NaOH solution, stirred well, followed by filtration, washing with water and drying, thereby covering the $Al_2O_3$-doped $\alpha\text{-}Fe_2O_3$ particles with Y.

A measured portion (10 g) of the thus prepared $Al_2O_3$ and Y-containing $\alpha\text{-}Fe_2O_3$ was charged into a rotary furnace and reduced by heating at 450° C. for 10 hours with a hydrogen stream being introduced. After the end of reduction, nitrogen gas was introduced and the interior of the furnace was cooled to room temperature. Subsequently, 1% $O_2$-containing nitrogen gas was introduced for 5 hours to effect slow oxidation, thereby yielding a metallic magnetic powder containing both Al and Y. The metallic magnetic powder thus prepared was suspended in $CO_2$-containing pure water, followed by filtration, washing with water and drying. A sequence of these steps were performed in a nitrogen atmosphere. The analytical data of the metallic magnetic powder produced, as well as its powder and magnetic characteristics are shown in Table 4.

EXAMPLE 39

The procedure of Example 38 was repeated, except that $\alpha\text{-}FeOOH$ particles having a length of particle of 0.12 µm and an aspect ratio of 8 were used instead of the $\alpha\text{-}FeOOH$ particles used in Example 38. The analytical data of this metallic magnetic powder, as well as its powder and magnetic characteristics were measured and the results are shown in Table 4.

EXAMPLE 40

The procedure of Example 38 was repeated, except that $\alpha\text{-}FeOOH$ particles having a length of particle of 0.15 µm and an aspect ratio of 8 were used instead of the $\alpha\text{-}FeOOH$ particles used in Example 38. The analytical data of the metallic magnetic powder produced, as well as its powder and magnetic characteristics are shown in Table 4.

EXAMPLE 41

Fifty grams of $\alpha\text{-}FeOOH$ (length of particle, 0.15 µm; aspect ratio, 8) were suspended in 5 liters of pure water and the resulting slurry was stirred well, followed by adding thereto 60 cc of a solution containing 1M/1 of cobalt chloride and stirring. Forty five grams of an aqueous 10% NaOH solution were also added to the slurry which was stirred and in which 28 cc of a solution containing 1M/1 of aluminum sulfate $Al_2(SO_4)_3$ was dissolved. Carbon dioxide gas was blown into the slurry to neutralize it to a pH of 9 or less, whereby the surfaces of the $\alpha\text{-}FeOOH$ particles containing 10%, based on the amount of Fe, of Co were covered with hydrous aluminum oxide $(Al_2O_3 \cdot nH_2O)$. The hydrous aluminum oxide-covered $\alpha\text{-}FeOOH$ particles thus prepared were filtered, washed with water, dried and heated at 400° C. for 3 hours to effect transformation to $Al_2O_3$-doped $\alpha\text{-}Fe_2O_3$. The powder of $Al_2O_3$-doped $\alpha\text{-}Fe_2O_3$ was disintegrated into particles, which were suspended in pure water, refiltered, washed with water, thereby yielding $Al_2O_3$-doped $\alpha\text{-}Fe_2O_3$ that was substantially free from Na and elements of Group Ia of the periodic table.

The thus prepared Al-containing $\alpha\text{-}Fe_2O_3$ was suspended in 1 liter of an aqueous solution having 3.1 g of yttrium nitrate dissolved therein, followed by adding thereto 100 g of an aqueous 20% $NH_3$ solution. After stirring well the slurry was filtered, washed with water and dried, thereby yielding Y-covered, $Al_2O_3$-doped $\alpha\text{-}Fe_2O_3$.

A measured portion (10 g) of the thus prepared $Al_2O_3$ and Y-containing $\alpha\text{-}Fe_2O_3$ was charged into a rotary furnace and reduced by heating at 450° C. for 10 hours with a hydrogen stream being introduced. After the end of reduction, nitrogen gas was introduced and the interior of the furnace was cooled to room temperature. Subsequently, 1% $O_2$-containing nitrogen gas was introduced for 5 hours to effect slow oxidation, thereby yielding a metallic magnetic powder containing both Al and Y. The thus produced powder was suspended again in pure water containing carbon dioxide, filtered, washed with water and dryied. A sequence of these steps were performed in a nitrogen atmosphere. The analytical data of the metallic powder produced, as well as its powder and magnetic characteristics are shown in Table 4.

EXAMPLE 42

The procedure of Example 41 was repeated, except that α-FeOOH particles having a length of particle of 0.20 μm and an aspect ratio of 8 were used instead of the α-FeOOH particles used in Example 41. The analytical data of the metallic magnetic powder, as well as its powder and magnetic characteristics are shown in Table 4.

EXAMPLE 43

The procedure of Example 41 was repeated, except that α-FeOOH particles having a length of particle of 0.28 μm and an aspect ratio of 10 were used instead of the α-FeOOH particles used in Example 41. The analytical data of the metallic magnetic powder, as well as its powder and magnetic characteristics are shown in Table 4.

Comparative Example 8

The procedure of Example 17 was repeated, except that the step of adding 60 cc of the solution containing 1M/1 of cobalt chloride was omitted and the surfaces of Co-free α-FeOOH particles were covered with hydrous aluminum oxide ($Al_2O_3 \cdot nH_2O$). The analytical data of the metallic magnetic powder, as well as its powder and magnetic characteristics are shown in Table 3.

Comparative Example 9

The procedure of Example 24 was repeated, except that the step of adding 60 cc of the solution containing 1M/1 of cobalt chloride was omitted and Co-free α-FeOOH was produced. The analytical data of the metallic magnetic powder, as well as its powder and magnetic characteristics are shown in Table 3.

Comparative Example 10

The procedure of Example 29 was repeated, except that the step of adding 60 cc of the solution containing 1M/1 of cobalt chloride was omitted and the surfaces of the Co-free α-FeOOH particles were covered with hydrous aluminum oxide ($Al_2O_3 \cdot nH_2O$). The analytical data of the metallic magnetic powder, as well as its powder and magnetic characteristics are shown in Table 3.

Comparative Example 11

The procedure of Example 25 was repeated, except that the step of washing the α-$Fe_2O_3$ produced by heating at 400° C. for 3 hours with pure water and the step of covering the particles with Y were omitted and that the step of finally washing metallic magnetic powder with carbon dioxide-containing pure water was also omitted. The analytical data of this powder, as well as its powder and magnetic characteristics are shown in Table 4.

Comparative Example 12

The procedure of Example 25 was repeated, except that the step of covering with Y the α-$Fe_2O_3$ prepared by heating at 400° C. for 3 hours was omitted and that the step of finally washing metallic magnetic powder with carbon dioxide-containing pure water was also omitted. The analytical data of this powder, as well as its powder and magnetic characteristics are shown in Table 4.

Comparative Example 13

The procedure of Example 25 was repeated, except that the step of covering with Y the α-$Fe_2O_3$ prepared by heating at 400° C. for 3 hours was omitted. The analytical data of this powder, as well as its powder and magnetic characteristics are shown in Table 4.

TABLE 3-1

| | | | | | | | | | | | | | | | | |
|---|---|---|---|---|---|---|---|---|---|---|---|---|---|---|---|---|
| | | | | | | | | The Characteristics of Magnetic Powder | | | | | | | | |
| | | Analytical data | | | | | | Powder characteristics | | | | | Magnetic characteristic | | | |
| | Co | Al atm % | RE element name | atm % | Na wt % | sol. Ca wt % | Length of particle μm | Aspect ratio | BET $m^2/g$ | X-ray particle size Å | pH of powder | Adsorption of stearic acid mg/g | Hc | σs | $\frac{\sigma r}{\sigma s}$ | Δσs |
| Example | | | | | | | | | | | | | | | | |
| 17 | 10 | 10 | — | — | 0.002 | 0.005 | 0.08 | 5 | 63 | 170 | 9.5 | 116 | 1720 | 130 | 0.49 | 15.8 |
| 18 | 20 | 10 | — | — | 0.002 | 0.005 | 0.08 | 5 | 61 | 160 | 9.5 | 116 | 1891 | 137 | 0.498 | 13.3 |
| 19 | 30 | 10 | — | — | 0.002 | 0.005 | 0.08 | 5 | 59 | 155 | 9.5 | 104 | 1918 | 143 | 0.50 | 13.5 |
| 20 | 40 | 10 | — | — | 0.002 | 0.005 | 0.08 | 5 | 58 | 157 | 9.5 | 99 | 1824 | 152 | 0.49 | 13.4 |
| 21 | 50 | 10 | — | — | 0.002 | 0.005 | 0.08 | 4 | 57 | 160 | 9.5 | 102 | 1701 | 150 | 0.48 | 13.4 |
| 22 | 30 | 15 | — | — | 0.002 | 0.005 | 0.08 | 5 | 64 | 155 | 9.5 | 121 | 2068 | 138 | 0.50 | 10.0 |
| 23 | 10 | — | Y | 2.0 | 0.002 | 0.005 | 0.08 | 5 | 61 | 180 | 9.5 | 119 | 1316 | 132 | 0.483 | 19.3 |
| 24 | 20 | — | Y | 2.0 | 0.002 | 0.005 | 0.08 | 5 | 59 | 165 | 9.5 | 113 | 1504 | 139 | 0.490 | 15.3 |
| 25 | 30 | — | Y | 2.0 | 0.002 | 0.005 | 0.08 | 5 | 57 | 160 | 9.5 | 106 | 1526 | 145 | 0.492 | 16.2 |
| 26 | 40 | — | Y | 2.0 | 0.002 | 0.005 | 0.08 | 5 | 56 | 162 | 9.5 | 101 | 1404 | 154 | 0.480 | 15.5 |
| 27 | 50 | — | Y | 2.0 | 0.002 | 0.005 | 0.08 | 4 | 52 | 165 | 9.5 | 104 | 1310 | 152 | 0.470 | 15.5 |
| 28 | 30 | — | Y | 6.0 | 0.002 | 0.005 | 0.08 | 5 | 59 | 150 | 9.5 | 110 | 1576 | 140 | 0.502 | 9.2 |
| 29 | 10 | 10 | Y | 2.0 | 0.002 | 0.005 | 0.08 | 5 | 64 | 165 | 9.5 | 112 | 1875 | 129 | 0.510 | 11.8 |
| 30 | 20 | 10 | Y | 2.0 | 0.002 | 0.005 | 0.08 | 5 | 62 | 155 | 9.6 | 107 | 2150 | 134 | 0.518 | 9.4 |
| 31 | 30 | 10 | Y | 2.0 | 0.002 | 0.005 | 0.08 | 5 | 60 | 150 | 9.5 | 100 | 2175 | 140 | 0.520 | 9.8 |
| 32 | 40 | 10 | Y | 2.0 | 0.002 | 0.005 | 0.08 | 5 | 59 | 153 | 9.5 | 95 | 1958 | 149 | 0.510 | 9.5 |
| 33 | 50 | 10 | Y | 2.0 | 0.002 | 0.005 | 0.08 | 4 | 58 | 155 | 9.5 | 98 | 1825 | 147 | 0.490 | 9.5 |
| Comparative Example | | | | | | | | | | | | | | | | |
| 5 | 55 | 10 | — | — | 0.002 | 0.005 | 0.08 | 4 | 56 | 162 | 9.5 | 101 | 1403 | 146 | 0.455 | 13.4 |
| 6 | 55 | — | Y | 2.0 | 0.002 | 0.005 | 0.08 | 4 | 51 | 167 | 9.5 | 102 | 1037 | 149 | 0.440 | 15.5 |
| 7 | 55 | 10 | Y | 2.0 | 0.002 | 0.005 | 0.08 | 4 | 57 | 157 | 9.5 | 96 | 1520 | 144 | 0.465 | 9.5 |
| 8 | 0 | 10 | — | — | 0.002 | 0.005 | 0.08 | 6 | 62 | 190 | 9.5 | 114 | 1595 | 116 | 0.470 | 24.9 |
| 9 | 0 | — | Y | 2.0 | 0.002 | 0.005 | 0.08 | 6 | 60 | 195 | 9.5 | 108 | 1212 | 118 | 0.46 | 27.4 |
| 10 | 0 | 10 | Y | 2.0 | 0.002 | 0.005 | 0.08 | 6 | 63 | 185 | 9.4 | 102 | 1770 | 114 | 0.490 | 16.8 |

TABLE 3-2

| | Roughness Å | Gloss | Tape Characteristics | | | | | | | |
|---|---|---|---|---|---|---|---|---|---|---|
| | | | Hc Oe | Bm G | Br/Bm | SFD | OR | Δ Bm % | Output dB | C/N dB |
| Example | | | | | | | | | | |
| 17 | 74 | 188 | 1810 | 3000 | 0.80 | 0.66 | 2.30 | 5.2 | +2.5 | +2.7 |
| 18 | 69 | 192 | 1910 | 3270 | 0.798 | 0.62 | 2.27 | 4.4 | +3.7 | +4.7 |
| 19 | 67 | 195 | 1968 | 4075 | 0.792 | 0.60 | 2.24 | 4.5 | +3.9 | +4.9 |
| 20 | 68 | 197 | 1878 | 4291 | 0.781 | 0.67 | 2.20 | 4.5 | +2.9 | +3.9 |
| 21 | 72 | 196 | 1731 | 4235 | 0.76 | 0.79 | 2.14 | 4.5 | +1.8 | +2.5 |
| 22 | 66 | 198 | 2095 | 3280 | 0.792 | 0.54 | 2.25 | 4.1 | +3.9 | +4.9 |
| 23 | 85 | 175 | 1379 | 3090 | 0.775 | 0.94 | 2.18 | 6.4 | +2.0 | +2.1 |
| 24 | 77 | 180 | 1554 | 3370 | 0.770 | 0.80 | 2.15 | 5.1 | +3.2 | +3.7 |
| 25 | 74 | 187 | 1561 | 4200 | 0.760 | 0.78 | 2.10 | 5.4 | +3.4 | +4.0 |
| 26 | 75 | 191 | 1458 | 4422 | 0.748 | 0.96 | 2.02 | 5.2 | +2.4 | +3.4 |
| 27 | 78 | 188 | 1245 | 4364 | 0.725 | 1.12 | 1.90 | 5.2 | +1.3 | +2.1 |
| 28 | 74 | 182 | 1611 | 3380 | 0.765 | 0.85 | 2.15 | 3.1 | +3.5 | +4.5 |
| 29 | 68 | 196 | 1965 | 3200 | 0.859 | 0.58 | 2.4 | 3.9 | +3.6 | +4.1 |
| 30 | 64 | 196 | 2200 | 3490 | 0.854 | 0.50 | 2.39 | 3.1 | +4.8 | +5.8 |
| 31 | 63 | 198 | 2225 | 4350 | 0.850 | 0.48 | 2.38 | 3.3 | +5.0 | +6.0 |
| 32 | 64 | 199 | 2035 | 4580 | 0.837 | 0.59 | 2.36 | 4.8 | +4.0 | +5.0 |
| 33 | 67 | 198 | 1875 | 4520 | 0.820 | 0.69 | 2.32 | 1.7 | +2.9 | +3.6 |
| Comparative Example | | | | | | | | | | |
| 5 | 73 | 194 | 1416 | 4179 | 0.728 | 0.90 | 2.10 | 4.5 | −0.9 | −0.4 |
| 6 | 79 | 186 | 1058 | 4306 | 0.705 | 1.17 | 1.80 | 5.2 | −1.4 | −0.6 |
| 7 | 68 | 197 | 1520 | 4460 | 0.780 | 0.80 | 2.30 | 1.7 | +0.2 | +1.0 |
| 8 | 82 | 184 | 1660 | 2840 | 0.801 | 0.683 | 2.32 | 8.3 | +1.3 | +1.1 |
| 9 | 94 | 166 | 1247 | 2926 | 0.779 | 0.98 | 2.2 | 9.1 | +0.8 | +0.2 |
| 10 | 75 | 191 | 1820 | 3030 | 0.861 | 0.60 | 2.4 | 2.9 | +2.4 | +2.3 |

TABLE 4-1

| | | | The Characteristics of Magnetic Powder | | | | | | | | | | | | |
|---|---|---|---|---|---|---|---|---|---|---|---|---|---|---|---|
| | | Analytical data | | | | Length of particle μm | Aspect ratio | Powder characteristics | | pH of powder | Adsorption of stearic acid mg/g | Magnetic characteristic | | | |
| | Co | Al atm % | RE element name | RE element atm % | Na wt % | sol. Ca wt % | | | BET m²/g | X-ray particle size Å | | | Hc | σs | σr/σs | Δσs |
| Example | | | | | | | | | | | | | | | | |
| 34 | 30 | 10 | Y | 6.0 | 0.002 | 0.005 | 0.08 | 6 | 62 | 160 | 9.5 | 117 | 2248 | 140 | 0.52 | 13.0 |
| 35 | 30 | 5 | Y | 6.0 | 0.002 | 0.005 | 0.08 | 6 | 56 | 160 | 9.5 | 107 | 2242 | 144 | 0.52 | 11.4 |
| 36 | 30 | 10 | La | 4.0 | 0.002 | 0.005 | 0.08 | 6 | 58 | 180 | 9.3 | 111 | 2235 | 141 | 0.52 | 8.5 |
| 37 | 10 | 10 | La | 2.0 | 0.002 | 0.005 | 0.08 | 6 | 58 | 170 | 9.4 | 106 | 1840 | 130 | 0.50 | 11.9 |
| 38 | 30 | 10 | Y | 4.0 | 0.002 | 0.005 | 0.06 | 4 | 62 | 170 | 9.6 | 106 | 2225 | 139 | 0.522 | 10.1 |
| 39 | 30 | 10 | Y | 4.0 | 0.002 | 0.005 | 0.08 | 6 | 60 | 180 | 9.4 | 111 | 2240 | 143 | 0.52 | 8.4 |
| 40 | 30 | 10 | Y | 4.0 | 0.002 | 0.005 | 0.11 | 6 | 57 | 210 | 9.7 | 88 | 2155 | 152 | 0.51 | 5.0 |
| 41 | 10 | 10 | Y | 2.0 | 0.002 | 0.005 | 0.11 | 6 | 61 | 185 | 9.5 | 108 | 1655 | 133 | 0.50 | 10.0 |
| 42 | 10 | 10 | Y | 2.0 | 0.002 | 0.005 | 0.13 | 6 | 59 | 205 | 9.4 | 111 | 1665 | 136 | 0.49 | 7.2 |
| 43 | 10 | 10 | Y | 2.0 | 0.002 | 0.005 | 0.16 | 8 | 56 | 220 | 9.5 | 100 | 1675 | 140 | 0.50 | 6.3 |
| Comparative Example | | | | | | | | | | | | | | | | |
| 11 | 30 | — | — | — | 0.11 | 0.12 | 0.08 | 4 | 42 | 225 | 10.3 | 68 | 1211 | 160 | 0.43 | 11.3 |
| 12 | 30 | — | — | — | 0.002 | 0.12 | 0.08 | 4 | 43 | 225 | 9.7 | 63 | 1223 | 159 | 0.43 | 11.3 |
| 13 | 30 | — | — | — | 0.002 | 0.005 | 0.08 | 4 | 42 | 225 | 9.5 | 56 | 1254 | 160 | 0.44 | 11.0 |

TABLE 4-2

| | Roughness Å | Gloss | Tape Characteristics | | | | | | | |
|---|---|---|---|---|---|---|---|---|---|---|
| | | | Hc Oe | Bm G | Br/Bm | SFD | OR | Δ Bm % | Output dB | C/N dB |
| Example | | | | | | | | | | |
| 34 | 58 | 194 | 2420 | 4220 | 0.85 | 0.34 | 2.4 | 4.3 | +5.6 | +6.3 |
| 35 | 58 | 196 | 2386 | 4320 | 0.85 | 0.35 | 2.4 | 3.8 | +5.6 | +6.1 |
| 36 | 62 | 193 | 2334 | 4250 | 0.85 | 0.44 | 2.4 | 2.8 | +5.4 | +5.5 |
| 37 | 71 | 192 | 2030 | 3030 | 0.83 | 0.75 | 2.4 | 3.9 | +3.3 | +3.7 |

TABLE 4-2-continued

| | Tape Characteristics | | | | | | | | | |
|---|---|---|---|---|---|---|---|---|---|---|
| | Roughness Å | Gloss | Hc Oe | Bm G | Br/Bm | SFD | OR | Δ Bm % | Output dB | C/N dB |
| 38 | 59 | 196 | 2310 | 4380 | 0.809 | 0.45 | 2.3 | 3.4 | +5.6 | +6.0 |
| 39 | 60 | 195 | 2239 | 4250 | 0.848 | 0.43 | 2.4 | 2.8 | +5.5 | +5.5 |
| 40 | 62 | 198 | 2161 | 4780 | 0.831 | 0.42 | 2.6 | 1.6 | +3.8 | +3.1 |
| 41 | 70 | 195 | 1670 | 3000 | 0.84 | 0.51 | 2.6 | 3.3 | +3.2 | +3.1 |
| 42 | 72 | 193 | 1735 | 3590 | 0.86 | 0.47 | 2.8 | 2.4 | +3.3 | +2.3 |
| 43 | 74 | 192 | 1634 | 3850 | 0.89 | 0.41 | 3.0 | 2.1 | +1.3 | +0.2 |
| Comparative Example | | | | | | | | | | |
| 11 | 111 | 136 | 1247 | 4218 | 0.60 | 0.77 | 1.8 | 3.9 | | |
| 12 | 101 | 146 | 1253 | 4495 | 0.64 | 0.74 | 1.8 | 3.9 | −3.9 | −4.7 |
| 13 | 97 | 161 | 1278 | 4700 | 0.68 | 0.72 | 1.8 | 3.7 | −3.3 | −4.3 |

What is claimed:

1. Acicular ferromagnetic metal particles consisting essentially of iron, cobalt in an amount of 50 atm % or less based on the amount of iron, 0.1–10% atm % based on the total quantity of the metal elements present of yttrium or any other rare earth element, and 0.05 wt % or less of an element of Group Ia of the periodic table contained as an incidental component, said element of Group Ia being selected from the group consisting of lithium, sodium and potassium.

2. Acicular ferromagnetic metal particles consisting essentially of iron, cobalt in an amount of 50 atm % or less based on the amount of iron, 0.1–30% atm % based on the total quantity of the metal elements present of aluminum, 0.1–10 atm % based on the total quantity of the metal elements present of yttrium or any other rare earth element, and 0.05 wt % or less of an element of Group Ia of the periodic table contained as an incidental component, said element of Group Ia being selected from the group consisting of lithium, sodium and potassium.

3. Acicular ferromagnetic metal particles having a coercivity of not less than 1600 Oe which consist essentially of iron, cobalt in an amount of 50 atm % or less based on the amount of iron, 0.1–30 atm % based on the total quantity of the metal elements present of aluminum, 0.1–10 atm % based on the total quantity of the metal elements present of yttrium or any other rare earth element, and 0.05 wt % or less of an element of Group Ia of the periodic table contained as an incidental component, said element of Group Ia being selected from the group consisting of lithium, sodium and potassium.

4. Acicular ferromagnetic metal particles having an X-ray particle size of not greater than 220 Å which consist essentially of iron, cobalt in an amount of 50 atm % or less based on the amount of iron, 0.1–30 atm % based on the total quantity of the metal elements present of aluminum, 0.1–10 atm % based on the total quantity of the metal elements present of yttrium or any other rare earth element, and 0.05 wt % or less of an element of Group Ia of the periodic table contained as an incidental component, said element of Group Ia being selected from the group consisting of lithium, sodium and potassium; the X-ray particle size being the particle size as calculated from an X-ray diffraction peak for a (110) face of α-Fe.

5. Acicular ferromagnetic metal particles having a value of σr to σs ratio (σr/σs) of not less than 0.47 which consist essentially of iron, cobalt in an amount of 50 atm % or less based on the amount of iron, 0.1–30 atm % based on the total quantity of the metal elements present of aluminum, 0.1–10 atm % based on the total quantity of the metal elements present of yttrium or any other rare earth element, and 0.05 wt % or less of an element of Group Ia of the periodic table contained as an incidental component, said element of Group Ia being selected from the group consisting of lithium, sodium and potassium; wherein σr is the remanence magnetization and σs is the saturation magnetization.

6. Acicular ferromagnetic metal particles according to any one of claims 1, 2, 3, 4 and 5, having a content of 0.1 wt % or less of a soluble element of Group IIa of the periodic table contained as another incidental component, said element of Group IIa being selected from the group consisting of magnesium, calcium, strontium and barium.

7. Acicular ferromagnetic metal particles according to any one of claims 1, 2, 3, 4 and 5, wherein the content of cobalt is 10–35 atm % based on the amount of iron.

8. Acicular ferromagnetic metal particles according to claim 6, wherein the content of cobalt is 10–35 atm % based on the amount of iron.

9. Magnetic recording media comprising a substrate having a layer of acicular ferromagnetic metal particles in a binder fixed on a surface thereof, said particles being acicular ferromagnetic metal particles according to any one of claims 1, 2, 3, 4 and 5.

10. Magnetic recording media comprising a substrate having a layer of acicular ferromagnetic metal particles in a binder fixed on a surface thereof, said particles being acicular ferromagnetic metal particles according to claim 6.

11. Magnetic recording media comprising a substrate having a layer of acicular ferromagnetic metal particles in a binder fixed on a surface thereof, said particles being acicular ferromagnetic metal particles according to claim 7.

12. Magnetic recording media comprising a substrate having a layer of acicular ferromagnetic metal particles in a binder fixed on a surface thereof, said particles being acicular ferromagnetic metal particles according to claim 8.

13. Acicular ferromagnetic metal particles according to any one of claims 1, 2, 3, 4, and 5, wherein the content of yttrium or any other rare earth element is 0.2–5 atm % based on the total quantity of the metal elements present.

14. Magnetic recording media comprising a substrate having a layer of acicular ferromagnetic metal particles in a binder fixed on a surface thereof, said particles being acicular ferromagnetic metal particles according to claim 13.

15. Magnetic recording media according to claim 14, wherein said particles have a content of 0.1 wt % or less of a soluble element of Group IIa of the periodic table contained as another incidental component, said element of Group IIa being selected from the group consisting of magnesium, calcium, strontium and barium.

16. Magnetic recording media comprising a substrate having a layer of acicular ferromagnetic metal particles in a binder fixed on a surface thereof, said acicular ferromagnetic metal particles being acicular ferromagnetic metal particles consisting essentially of iron, cobalt in an amount of 10–35 atm % based on the amount of iron, 1–20 atm % based on the total quantity of the metal elements present of aluminum, 0.2–5 atm % based on the total quantity of the metal elements present of yttrium, 0.05 wt % or less of an element of Group Ia of the periodic table contained as an incidental component, said element of Group Ia being selected from the group consisting of lithium, sodium and potassium, and 0.1 wt % or less of a soluble element of Group IIa of the periodic table contained as another incidental component, said element of Group IIa being selected from the group consisting of magnesium, calcium, strontium, and barium.

17. Acicular ferromagnetic metal particles consisting essentially of iron, cobalt in an amount of 10–35 atm % based on the amount of iron, 1–20 atm % based on the total quantity of the metal elements present of aluminum, 0.2–5 atm % based on the total quantity of the metal elements present of yttrium, 0.05 wt % or less of an element of Group Ia of the periodic table contained as an incidental component, said element of Group Ia being selected from the group consisting of lithium, sodium and potassium, and 0.1 wt % or less of a soluble element of Group IIa of the periodic table contained as another incidental component, said element of Group IIa being selected from the group consisting of magnesium, calcium, strontium, and barium.

* * * * *